July 11, 1961  J. GLATTER ET AL  2,991,601

PROCESS OF FORMING POWDERED MATERIAL

Filed May 14, 1956

WITNESSES:
J. E. Bieber
Leon M. Garman

INVENTORS
Thomas J. Burke
Jacob Glatter and
Burton E. Schaner
BY
Arthur T. Stratton
ATTORNEY

United States Patent Office 2,991,601
Patented July 11, 1961

2,991,601
PROCESS OF FORMING POWDERED MATERIAL
Jacob Glatter, Burton E. Schaner, and Thomas J. Burke, Pittsburgh, Pa., assignors, by mesne assignments, to the United States of America as represented by the United States Atomic Energy Commission
Filed May 14, 1956, Ser. No. 584,828
6 Claims. (Cl. 53—24)

This invention pertains generally to a method of manufacturing a composite article and, more particularly, a clad article having a core comprised of a plurality of high density compacts of a powdered ceramic type of material.

While articles formed from compacts of powdered materials have been suggested in the past no method has been devised for forming high density compacts of ceramic type materials, such as the oxides of thorium, uranium and materials having similar properties. Compacts of powdered metallic uranium, for example, have been suggested but the processes used will not produce high density compacts of oxides of uranium and materials having similar properties. This type of compact has been suggested for uses where the core is of an active material and it is desired to enclose it in a protective jacket. For example, it has been suggested that fuel elements for an atomic reactor be formed in this manner, where uranium is the active material. Uranium dioxide is a relatively cheap material, but heretofore it has not been possible to form it of sufficient density to be useful for this purpose.

Accordingly an object of this invention is to provide a novel process for the economical fabrication of a high density compact from materials such as an oxide of fissionable material which is adaptable for use in an atomic reactor.

Another object of this invention is a process for forming fuel elements from high density compacts of oxides of fissionable material by means of cold pressing the oxide into compacts and then sintering the compacts in a non-oxidizing atmosphere. The sintered compacts are then installed in a tubular cladding member of any desired length with the ends of the tubular cladding member being hermetically sealed.

These and other objects and advantages of this invention will be more easily understood from the following detailed description of an illustrative process for fabricating uranium dioxide, and the die and punch used in forming dense compacts of uranium dioxide when taken in conjunction with the accompanying drawings, in which.

Figure 1:
FIGURE 1 is an isometric view of a compact used in accordance with this invention.

The process of this invention for fabricating composite elements employs cold pressing of a powder, which may be a metallic oxide, and in the illustrative embodiment of the invention comprises an oxide of fissionable material such as uranium dioxide, to form dense compacts, and the subsequent sintering of the compacts in a non-oxidizing atmosphere. While uranium dioxide fuel elements have been suggested in the past for atomic reactors, no satisfactory method for their fabrication has ever been developed. This invention discloses a satisfactory process for fabricating uranium dioxide or other oxides of fissionable material in a form suitable for fuel elements, and the design of a particular die and punch which will produce dense compacts of these materials.

Certain metallic powders, such as uranium dioxide powder, which has been manufactured by the hydrogen reduction of uranium trioxide, as received from commercial manufacturers is not free flowing and, thus, is not adaptable for use in automatic machinery for the production of dense compacts. In order to convert the non-flowing commercial powder to free-flowing granules, it is necessary to employ an agglomeration process. In order to agglomerate the powder, it is first mixed with a suitable binder and then mixed with water to form a wet granulate. The wet granulate is then forced through a screen and dried, after which it is dry-screened so as to separate the larger particles from the smaller particles. It is preferable to employ a 20 mesh screen for the dry-screening operation. The material which does not pass through readily is forced through the 20 mesh screen. The binder should preferably be a readily heat decomposable resinous type of binder so that in subsequent operations it may readily be moved from the compacts. A suitable binder which satisfies the above properties is polyvinyl alcohol, although other resinous binders may be used. A suitable mixture consists of 1% by weight of w/o polyvinyl alcohol and sufficient water, approximately 7.5 w/o, to form a paste when the polyvinyl alcohol is mixed with the uranium dioxide powder.

It was found that the force necessary to eject a compact from the die after pressing could be reduced either by lubricating the die surfaces between pressings with a suitable lubricant or by incorporating a lubricant directly with the metallic powder during the agglomeration process. A refined hydrogenated vegetable oil and aluminum stearate in .1 to .2 w/o quantities proved to be quite effective in lubricating the die and materially increased the pressing rates. For example, by using .2 w/o of the above lubricant combined with the agglomerated powder pressing rates could be increased from 17 per minute to 26 per minute with no deleterious effects on the compacts. The use of a lubricant also greatly reduces die wear and permits the use of higher compacting pressures to give higher density compacts without cracking of the compacts while improving the surface condition of the compacts. The lubricant is removed in the same operation in which the polyvinyl alcohol is removed, thus it requires no additional treatment.

After the powder has been converted to free-flowing granules of uranium dioxide, it is converted into compacts by means of a cold pressing operation. It is preferable to employ a press which will apply force to the compact from both the top and bottom and some means to automatically feed predetermined quantities of the metallic powder directly to the die cavity. In addition, it is desirable to use some means to equalize the pressure between various compacts so that all compacts receive the same compaction pressure. While the compacts may be of any desired size, it has been found that best results are obtained when the compacts have a length to diameter ratio of approximately one. An example is a compact having a nominal diameter of .415 inch and a length of .415 inch. Compacts of this size having a density of about 70% of that theoretically possible were formed by using pressures of the order of 125 tons per square inch. The theoretical density of uranium dioxide in the above example is considered equal to 10.95 grams per cubic centimeter. In forming these compacts it was discovered that a particular design of die and punch was necessary in order to permit the automatic fabrication of compacts over an extended period of time. A particular die and punch which will fulfill these requirements will be described later.

After the compacts have been formed, they may be pretreated to remove the resinous binder and lubricant prior to sintering of the compacts. The resinous binder and lubricant can be completely removed by heating the compacts in a continuous flowing carbon dioxide atmosphere which has been dried and deoxidized at a temperature of between 500° C. to 900° C. for approximately 2 hours. The rate of heating and cooling of the compacts should be slow enough to prevent cracking or spalling of the compacts due to sudden changes in temperature.

The binder and lubricant cannot be driven off by heat treatment in an air furnace with a material such as uranium dioxide, because it will be transformed into a higher oxide of uranium. While high temperature sintering in an inert gas, such as argon, will decompose the binder and lubricant, a carbon residue is formed which will react with $UO_2$ at high temperature to form $UC_2$. The $UC_2$ will decompose in water and thus cannot be tolerated for use where it may be contacted by water, as in a water cooled and moderated atomic reactor, even though the $UC_2$ is clad with another material, inasmuch as the cladding may fail. High temperature sintering in a hydrogen atmosphere will remove the binder and lubricant but it requires a temperature above 1500° C. At this temperature the reaction products, such as methane and ethane, which result from the reaction of hydrogen with the binder and lubricant readily combine with the molybdenum resistor elements of the furnace causing premature failure of the furnace.

In the carbon dioxide heat treatment the hydrocarbons of the binder break down at relatively low temperatures into carbon and a complicated series of tars and resins. The tars and resins are volatile and are removed by the steady flow of carbon dioxide gas while the carbon combines with the carbon dioxide to form carbon monoxide.

The application of this treatment to $UO_2$ fuel compacts containing 1% by weight of polyvinyl alcohol and .2% by weight of aluminum stearate has shown the following results:

The carbon content was reduced from an initial value of 5000 to 7000 parts per million in the pressed compacts to 20 to 48 parts per million. Hydrogen content was reduced from an initial theoretical value of 8200 to 9000 parts per million to less than 50 parts per million. The carbon content of commercial $UO_2$ is between 70 and 100 parts per million; thus the carbon dioxide treatment reduces the carbon content below that of the original $UO_2$.

After the above low temperature pre-treatment, the compacts are sintered in a non-oxidizing atmosphere at a temperature of the order of 1700° C. until a density of at least 9.86 grams per cubic centimeter is achieved. Approximately 10 hours at a temperature of about 1700° C. is necessary to achieve the above density. While a suitable inert atmosphere, such as argon, may be used, hydrogen also forms an excellent atmosphere for the sintering of uranium dioxide compacts. The hydrogen atmosphere will not react with the uranium dioxide to reduce it to metallic uranium. Furthermore, hydrogen sintering will burn out and volatilize the hydrocarbons contained in the resinous binder thus allowing a choice of foregoing the $CO_2$ pretreatment if it is so desired. Of course, sintering in a hydrogen atmosphere will cause premature failure of the molybdenum furnace elements as described above. The rates of heating and cooling the compacts during the sintering operation should be slow enough to prevent the cracking or spalling of the compacts, and the compacts should not be removed from the protective atmosphere until the temperature has dropped below 100° C. During sintering, the compacts should be contained in non-reactive refractory trays. Molybdenum lined, high purity aluminum oxide trays are recommended.

Figure 2:
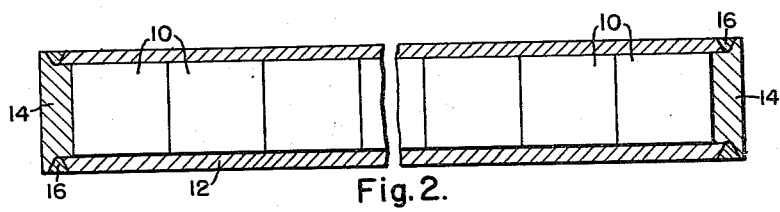
FIG. 2 is a longitudinal section showing a plurality of the compacts shown in FIG. 1 installed in a tubular member which is sealed at each end.

After the sintering operation, the compacts 10 may be installed in a tubular metallic member 12 as shown in FIG. 2. Any number of compacts 10 may be used to form a composite element of any desired length. The tubular member 12 should be formed of a suitable corrosion-resistant material, and for use as a fuel element of an atomic reactor, it should also be of a low neutron absorption cross-section metal or alloy, such as zirconium, alloys thereof, or stainless steel. A very satisfactory alloy is disclosed in the copending application of D. E. Thomas, K. M. Goldman, R. B. Gordon and W. A. Johnson entitled Zirconium Alloys, Serial No. 416,396, filed March 3, 1954, now Patent 2,772,964 and assigned to the same assignee as this invention. The tubular member 12 is sealed at each end by means of end caps 14 which are welded to the tubular member by means of an annular weld 16. Any number of completed fuel elements as shown in FIG. 2 may be assembled in any desired geometric shape to form a subassembly which can be used for fabricating an atomic reactor core.

While the above process will produce satisfactory fuel elements with a minimum of cost, voids are sometimes present between the individual compacts 10 in the tubular member 12. These voids are caused by small variations between the dimensions of the various compacts. In some cases it is desirable to eliminate the possibility of these voids so that the characteristics of the composite article can be more accurately predicted. For example, in the case of an atomic reactor, nuclear physics characteristics of the reactor core can be predicted with great accuracy prior to the operation of the reactor.

In order to eliminate the possibility of voids between the individual compacts 10, it is possible to grind the outside diameter of the compacts and to grind both ends of the compacts so that they are square with the outside diameter of the compacts. The compacts described above were ground to an outside diameter of 0.356 inch with a tolerance of plus zero minus .0005 inch, and a length of 0.3527 inch, with a tolerance of plus or minus .005 inch. The ground compacts 10 were then installed in a tubular member 12 having an inside diameter of .3585 inch with a tolerance of plus or minus .0005 inch, thus insuring an accurate fit between the compacts 10 and the tubular member 12 and an intimate contact between the adjacent ends of the compacts 10. Fuel elements fabricated with the precision ground compacts as described above will be uniform and will allow the accurate determination of nuclear characteristics of a reactor core prior to its operation. In those cases where slight inaccuracies in the predicted characteristics of the core may be tolerated, the cost of precision grinding of the compacts 10 and the precision manufacturing of the tubular member 12 could be dispensed with.

Figure 3:
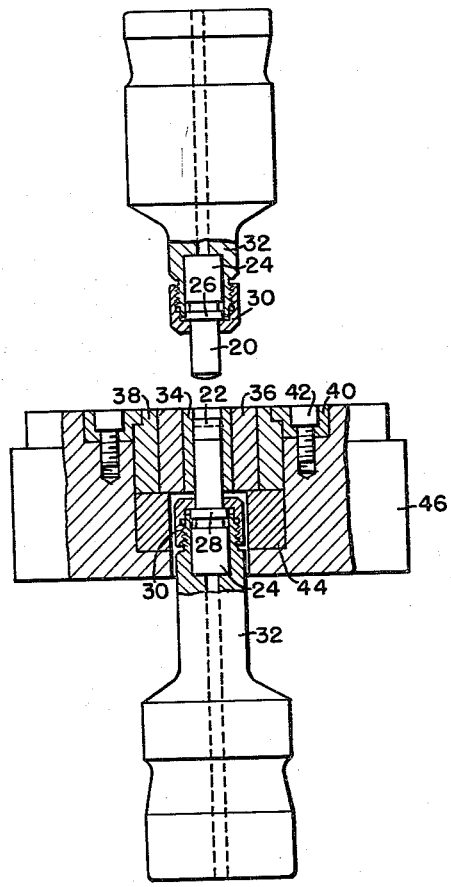
FIG. 3 is a partial elevation view shown partly in section of the die and punch used in fabricating the compact shown in FIG. 1.

A suitable die and punch combination for the cold pressing of the compacts 10 is shown in FIG. 3. In the cold pressing of a powder, such as commerically produced uranium dioxide powder, great care must be exercised in the design and fabrication of dies and punches because of the extremely high pressures, on the order of 125 tons per square inch required, in order to achieve a theoretical density of between 70% and 75% in the green or pressed compacts 10. Also, such a powder may be somewhat abrasive in nature, and if suitable materials are not used in fabricating the die, the die will wear extremely rapidly thus making the fabrication of accurate compacts extremely difficult. Dies of high carbon, high chrome-tool steel which are hardened to a range of 60 to 65 on the Rockwell "C" scale were initially tried in the cold pressing of compacts. The life of these dies was extremely short because of the extreme scoring of the die wall caused by the force necessary to eject the compact from the die. This ejection force was necessary because during compaction the die expanded and when the compacting load was removed, the contraction of the die around the compact exerted considerable binding force on the compact, thus necessitating the use of considerable force to eject the compact from the die. This binding action of the die coupled with the abrasive nature of powders, such as uranium dioxide powder, caused considerable wear of the die wall. This wear of the die wall has been virtually eliminated by using an extremely hard relatively non-compressible material for the liner 34, such as tungsten carbide, shown in FIG. 3. In order to place the liner 34 under compression and thus prevent fracture of the liner 34 during compaction, force fit rings 36 and 38 of a hard material, such as steel, were placed around the liner 34. It has been determined that a tungsten carbide liner having a 0.650 inch outside diameter requires an interference fit between its outer diameter and its force fit ring 36 on the order of .005 inch. The force fit ring 36 has an approximate outer diameter of 1½ inches, and an interference fit of approximately .007 inch between it and the force fit ring 38 is desirable.

By employing force fit rings 36 and 38 having the above interference fits, the amount of expansion of the liner 34 during compaction was greatly reduced thereby preventing fracture of the brittle liner. Experience has also shown that by employing a highly polished surface on the liner 34, both the compacting and the ejecting pressures can be further reduced. The formation of lamellar cracks is prevented by slightly tapering the exit of the die, so that the compact may expand gradually as it is ejected from the die. It has been found by experiment that for a compact having a length of approximately 0.410 inch, a .003 inch taper over a length of .250 inch is satisfactory. The die 34 and the force fit rings 36 and 38 are mounted in a die holder 46 by means of a ring 40 which is attached to the die holder by means of a plurality of circumferentially-spaced cap screws 42. A suitable spacing member 44 is placed beneath the composite die member so that the top of the die member is flush with the top of the die holder 46.

The punches initially used were fabricated from hardened tool steel but were found to be entirely unsatisfactory due to expansion caused by the extremely high pressures used during compaction. It was then determined that a suitable punch material would have to have a high compressive strength and be extremely hard, such as tungsten carbide, to prevent its chipping or breakage during operation. Tungsten carbide being an extremely hard and brittle material having a high compressive strength, punches fabricated from it will not plastically deform even under extremely high pressures.

After experimenting with various punch tip configurations, the best combination found of those tried was a lower punch with a flat face and an upper punch with a convex face having a 0.9375 inch radius. The convex tipped ram was found necessary to prevent the formation of cracks at the top corners of the compacts. The punch 20 is mounted in a suitable punch holder 32 by means of a radially projecting flange 26 which bears against the cap member 30. Cap member 30 has central opening for the punch 20 and threads onto the lower end of the holder 32 and serves to lock punch 20 against back up member 24. The radially projecting flange 26 is made by shrinking a tool steel ring on the outer surface of a cylindrical tungsten carbide member 20 and brazing it in place. A suitable back-up member 24 is provided on top of the punch 20 so that the force exerted on the die holder will be transmitted directly to the punch 20. While tool steel was originally used for the back-up members 24, it allowed the much harder tungsten carbide punch to indent its lower surface, which eventually resulted in damage to the punch, thus requiring the use of a back up member 24 formed of a similar material, such as tungsten carbide.

A modified form of the punch 20 is employed as the lower punch 22. The lower punch 22 is mounted in a second punch holder 32 in the same manner as punch 20. The punch 22 and its back-up member 24 are also formed of tungsten carbide. In addition to exerting a force on the bottom of the compact during compaction, the punch 22 is used in ejecting the compact from the die. It was also determined that in order to prevent failure of the tungsten carbide punches that the edge of the punch face must be provided with a small radius on the order of 0.005 inch.

There is thus provided a die and punch member which is capable of fabricating compacts of uranium dioxide for an extended period of time without undue wear occurring in the die member. In addition to allowing the fabrication of a great number of uranium dioxide compacts, the die and punch members also insure uniform accuracy of dimensions between the various compacts. By radiusing the edges of the face of the punch and providing back up members of tungsten carbide, this invention allows the use of tungsten carbide punches. Previous to this invention, it had been the practice to make the punch members of a softer material than the die member.

While this invention has been described with reference to a specific example of one form of powder, it need not be limited to this specific material. For example, compacts of uranium dioxide employing enriched uranium could also be fabricated by the above process, or compacts of thorium oxide could be fabricated. Also, compacts employing both oxides and metallic forms of either enriched or natural thorium or uranium could also be fabricated by the above process. In addition, this process can be used for forming compacts of other materials having properties similar to uranium oxide. Accordingly, this invention should not tbe limited to the above-described construction but only as required by the prior art.

We claim as our invention:

1. In the process of making reactor fuel elements the steps comprising agglomerating an oxide powder of a fissionable material with a heat decomposable binder to form free-flowing granules of said oxide, flowing a predetermined quantity of the granules of said oxide into a die, cold pressing the granules in the die into relatively short compacts, sintering the compacts, the binder being decomposed and removed during the sintering operation, substantially filling a relatively long tube with a plurality of said sintered compacts, said tube being formed of a corrosion-resistant metal having a low neutron absorbing cross-section, and installing vapor tight end caps in each end of said tube so that the sintered compacts are held in close contact with each other.

2. In the process of making reactor fuel elements the steps comprising agglomerating an oxide powder of a fissionable material with a readily heat decomposable binder to form free-flowing granules of the oxide, flowing a predetermined quantity of the granules into a die, cold pressing the granules in the die into relatively short compacts, sintering the compacts in a non-oxidizing atmosphere at a temperature above 1700 degrees centigrade, the binder being decomposed and removed during the sintering operation, substantially filling a relatively long tube with a plurality of said sintered compacts, said tube being formed of a corrosion-resistant metal having a low neutron absorbing cross-section, and installing vapor tight end caps in each end of said tube so that the sintered compacts are held in close contact with each other.

3. In the process of making reactor fuel elements the steps comprising agglomerating uranium dioxide powder with a readily heat decomposable resinous binder to form free-flowing granules of uranium dioxide, cold pressing the granules into small compacts, removing the resinous binder by heating said compacts in a steady flow of dry carbon dioxide heated to a temperature of between 500° and 900° centigrade.

4. In the process of forming high density compacts of a powdered ceramic material the steps comprising, agglomerating said material with a heat decomposable binder to form a free flowing powder, adding a heat decomposable lubricant to said agglomerated material, flowing a quantity of said material into a die cavity and pressing it to form a compact, pretreating said compacts in a carbon dioxide atmosphere at a temperature of between 500° C. and 900° C. to remove said binder and said lubricant and then sintering said compacts in a non-oxidizing atmosphere at a temperature of about 1700° C.

5. In the process of forming high density compacts of a powdered ceramic material, the steps comprising agglomerating said material with a heat-decomposable binder to form a free-flowing powder, adding a heat-decomposable lubricant to said agglomerated material, placing a quantity of said material into a die cavity, pressing said material to form a compact thereof, pretreating said compacts in a steady flow of dry carbon dioxide heated to a temperature of between 500° C. and 900° C. to remove said binder and said lubricant, and sintering said compacts in a non-oxidizing atmosphere at a temperature in the neighborhood of 1700 °C.

6. In the process of forming high density compacts of a powdered ceramic material, the steps comprising agglomerating said material with a heat decomposable binder, placing a quantity of said material into a die cavity, pressing said material to form a compact thereof and treating said compacts in a steady flow of dry carbon dioxide heated to a temperature of between 500° C. and 900° C.

References Cited in the file of this patent

UNITED STATES PATENTS

| | | |
|---|---|---|
| 2,519,280 | Potter et al. | Aug. 15, 1950 |
| 2,577,923 | Scott et al. | Dec. 11, 1951 |
| 2,593,943 | Wainer | Apr. 22, 1952 |
| 2,708,656 | Fermi et al. | May 17, 1955 |

OTHER REFERENCES

Goetzel: Treatise on Powder Metallurgy, vol. I, Interscience Publishers, Inc. (1949); pp. 279, 508, 509, 538, 648.

Proceedings of the International Conference on the Peaceful Uses of Atomic Energy, vol. 9, held in Geneva August 8 to August 20, 1955, United Nations, New York, 1956, pp. 170–171, 221. (Copy available in Div. 46.)

AECD 3646, The Reactor Handbook, vol. 2, May 1955, pp. 997–998, available Technical Information Service, U.S. Atomic Energy Commission, Oak Ridge, Tenn.

Goetzel: Treatise on Powder Metallurgy, vol. 1, Interscience Publishers, Inc., 1949, p. 626.